United States Patent [19]
Olmsted et al.

[11] Patent Number: 5,957,773
[45] Date of Patent: Sep. 28, 1999

[54] METHOD AND APPARATUS FOR MEASURING GRAIN CHARACTERISTICS

[75] Inventors: Thomas R. Olmsted, Gainesville, Fla.; Scott R. Holicky, St Charles, Ill.; David L. Yergler, Paw Paw, Ill.; Curtis T. Hastings, Dekalb, Ill.

[73] Assignee: Dekalb Genetics Corporation, Mystic, Conn.

[21] Appl. No.: 08/832,433

[22] Filed: Apr. 2, 1997

Related U.S. Application Data

[51] Int. Cl.⁶ ..................................... A01F 12/50
[52] U.S. Cl. ........................... 460/7; 460/149; 56/10.2 B
[58] Field of Search ................................ 460/7, 1, 6, 114, 460/119, 149, 150; 56/1, 10.2 B, 10.2 C, 10.2 R, DIG. 15; 73/73, 149

[56] References Cited

U.S. PATENT DOCUMENTS

| | | | |
|---|---|---|---|
| 2,666,326 | 1/1954 | Poole et al. | 73/149 |
| 3,075,382 | 1/1963 | Mathias | 73/149 |
| 4,403,191 | 9/1983 | Satake | 324/452 |
| 4,487,278 | 12/1984 | Rosenthal | 177/25 |
| 4,852,028 | 7/1989 | Korpela et al. | 364/567 |
| 5,092,819 | 3/1992 | Schroeder et al. | 460/7 |
| 5,173,079 | 12/1992 | Gerrish | 460/7 |
| 5,318,475 | 6/1994 | Schrock et al. | 460/1 |
| 5,327,708 | 7/1994 | Gerrish | 56/1 |
| 5,480,354 | 1/1996 | Sadjadi | 460/7 |
| 5,487,702 | 1/1996 | Campbell et al. | 460/7 |
| 5,518,454 | 5/1996 | Twilley et al. | 460/7 |
| 5,685,772 | 11/1997 | Anderson et al. | 460/7 X |

FOREIGN PATENT DOCUMENTS

WO 92/15192   9/1992   WIPO .
WO 94/06271   3/1994   WIPO .

OTHER PUBLICATIONS

Almaco Specialized Agricultural Equipment Catalog, Almaco Box 296, 99 M Avenue Nevada, Iowa 50201 (515) 382–3506, (Date Unknown).

Carter Manufacturing Co., Inc., JD4435 Combine Modifications brochure, 919 E. Carter Court Brookston, IN 47923 (317) 563–3666, (Date Unknown).

Carter Manufacturing Co., Inc., Split Combine Weigh Buckets brochure, 919 E. Carter Court Brookston, IN 47923 (317) 563–3666 (Date Unknown).

Colvin, T.S., "Automated Weighing and Moisture Sampling For A Field–Plot Combine," *Applied Engineering in Agriculture*, 6(6):713–714, Nov. 1990.

Konzak, Davis, and Wilson, "Combine Harvest and Data Acquisition By One Person," *Crop Science*, 23:1205–1208, Nov.–Dec. 1983.

"Pioneer Hi–Bred's Amazing 2–Plot Combines," *Power Manager*, 10:3, Jun. 1996.

*Primary Examiner*—Terry Lee Melius
*Attorney, Agent, or Firm*—Arnold White & Durkee

[57] ABSTRACT

Methods and apparatus for measuring grain characteristics, including grain test weight, using a container having one or more sensors. The sensors may include moisture, weight, grain flow, density, and level sensors. The container may be attached to a grain harvesting device, such as a combine, for measuring characteristics of grain harvested from test plots. Multiple containers may be employed with a grain diversion device so that sequential test plots may be harvested and measured with little or no interruption. The sensors, grain diversion device, and other equipment may be in signal communication with a signal processor for automated measurement.

77 Claims, 9 Drawing Sheets

METHOD AND APPARATUS FOR MEASURING GRAIN CHARACTERISTICS

BACKGROUND OF THE INVENTION

1. Field of the Invention

This invention relates generally to grain harvesting and processing and, more specifically, to methods and apparatus for grain harvesting and simultaneous measurement of grain properties. In particular, this invention relates to grain harvesting systems utilizing multiple test weight buckets and multiple sensors, including ultrasonic and radar level sensing devices.

2. Description of the Related Art

Various grain characteristic information is used in seed research to determine which varieties or hybrids to advance to commercialization. During harvesting, such information may include parameters such as grain moisture content and grain bulk density (or "test weight"). For example, the yield of a number of different seed grain varieties or hybrids may be evaluated by growing them under differing conditions in individual "test plots". These individual plots may be harvested and analyzed for data, such as test weight and moisture content. To increase the efficiency of grain variety evaluation test plots, usually about 20 feet long and containing 2 rows of plants spaced about 30 inches apart, are typically planted adjacent each other so that a number of test plots may be harvested and analyzed using a single combine and associated measuring equipment. These test plots are typically planted sequentially with a vacant area of about 2–3 feet separating successive plots.

In the past, combines have been modified to include a "weigh bucket" to selectively receive and weigh grain harvested from each individual test plot. Weigh buckets typically include instrumentation that measures the plot weight, grain moisture and test weight in conjunction with a mechanical apparatus that holds a known volume of grain. In a typical test plot harvesting operation, a combine harvests the grain from a single plot and stops or delays prior to moving to the next plot so that the grain may be analyzed before being transferred to the combine's grain tank. During this time, the grain is threshed, cleaned, and deposited into a weigh bucket where weight and moisture content is typically measured. Once analysis of the grain has been completed, grain is discharged from the weigh bucket and the combine continues to the next test plot where grain is again collected and the process repeated. One disadvantage of past methods for harvesting and analyzing test plots is the time lost waiting for weigh bucket instrumentation to stabilize so that grain analysis may be completed and grain from one test plot discharged from the weigh bucket before moving to the next test plot.

Another disadvantage of previous test plot harvesting methods is that previous methods have typically employed segmented weigh bucket devices having separate containers for measuring test weight and grain weight, respectively. These methods utilize a "test weight device" for measuring grain density that is a relatively small container of known volume separate from the larger weigh bucket container where grain weight is measured. Such test weight devices have typically used mechanical "leveling" devices to remove excess grain from the top of the test weight device, so that test weight may be calculated from the known volume and measured weight of grain within the test weight device before the grain is dumped from the test weight device. Mechanical leveling devices have typically included a leveling arm attached to a motor, linear actuator, solenoid, or hydraulic or pneumatic cylinder which mechanically sweeps across the top of the device to remove excess grain. The use of two containers complicates harvesting and measuring operations, potentially increasing the delay in harvest time between adjacent plots. In addition, the separate test weight device and its associated components include a number of mechanical parts, such as levers and motors, linear actuators, solenoids, or hydraulic or pneumatic cylinders which complicate the overall system. Finally, measurement and calculation of test weight from a small subsample of the test plot harvest, coupled with reliance on mechanical action of a leveling arm to produce a known volume of grain may result in decreased test weight accuracy. Accuracy may be further compromised by the vibration of a moving harvesting machine during measurement and calculation.

Another segmented grain measuring device employs separate chambers for receiving and measuring grain. In this device, grain is received in an entrance chamber and transferred to a volume sizing chamber of known volume, where grain moisture is measured. A level detector is employed to initiate closing of a first gate between the entrance chamber and the volume sizing chamber when it senses that grain has completely filled the volume sizing chamber, thereby sizing a fixed volume grain sub-sample to be weighed. A second gate between the volume sizing chamber and a weigh chamber is then opened to transfer grain to the weigh chamber where the grain sub-sample is weighed. A third gate is then opened to discharge the grain. This segmented device also has the disadvantage of complicated mechanical operation.

In an effort to increase the efficiency of test plot harvesting and analysis, two-plot combine designs have been developed. In a two-plot combine device, two separate and parallel test plots may be harvested and analyzed simultaneously by a single combine having an individual weigh bucket for each test plot. Although such two-plot designs increase the efficiency of harvesting and analysis by allowing two test plots to be simultaneously processed, it is still typically necessary for a combine to delay between harvesting sequential sets of test plots.

SUMMARY OF THE INVENTION

In one aspect, this invention is a grain harvesting and measuring system including a grain harvesting device and at least one grain container coupled to the grain harvesting device. The system also includes at least one level sensor and at least one weight sensor in communication with the grain container. At least one signal processor is in signal communication with the level sensor and the weight sensor.

In another aspect, this invention is a grain measuring apparatus, including a grain container. The apparatus also includes a moisture sensor having an output signal representative of a moisture content of grain within the container, a weight sensor having an output signal representative of a weight of grain within the container, and a level sensor having an output signal representative of a level of grain within the container. The apparatus also includes a signal processor having an input comprising the moisture sensor output signal, the weight sensor output signal, and the level sensor output signal. The signal processor has an output representative of a characteristic of the grain.

In another aspect, this invention is a grain harvesting and measuring system including a grain harvesting device having at least one grain source. A plurality of grain containers are coupled to the grain harvesting device. Each of the grain containers has at least one respective inlet and at least one respective outlet in communication with the interior of the container. The system also includes at least one sensor having an output signal representative of a characteristic of grain within each of the respective containers, and at least one grain diversion device coupled between the grain source and at least two of the container grain inlets.

In another respect, this invention is a method for measuring characteristics of grain. The method includes the step of providing a grain measuring apparatus including a grain container, a moisture sensor having an output signal representative of a moisture content of grain within the container, a weight sensor having an output signal representative of a weight of grain within the container, a level sensor having an output signal representative of a level of grain within the container, and a signal processor having an input and an output. The signal processor input comprises the moisture sensor output signal, the weight sensor output signal, and the level sensor output signal, and the signal processor has an output representative of a characteristic of the grain. The method also includes the step of collecting grain within the container and measuring the level, weight, and moisture content of the grain within the container.

In another aspect, this invention is a method for harvesting grain, including the step of providing a grain harvesting and measuring system including a grain harvesting device, at least one grain container coupled to the grain harvesting device, at least one level sensor in communication with the grain container, at least one weight sensor in communication with the grain container, and at least one signal processor in signal communication with the level sensor and the weight sensor. The method also includes the steps of harvesting grain with the grain harvesting device, collecting the grain within the container; and measuring the level and weight of the grain within the container.

In another aspect, this invention is a method for harvesting grain test plots, including the step of providing a grain harvesting device having at least one grain source. The method also includes the step of providing a grain measuring apparatus that includes a plurality of grain containers coupled to the grain harvesting device, with each container having at least one respective inlet and at least one respective outlet in communication with the interior of the container. The apparatus also includes at least one sensor having an output signal representative of a characteristic of grain within each of the respective containers, and at least one grain diversion device coupled between the grain source and at least two of the container grain inlets. The method also includes the steps of harvesting the grain test plots with the grain harvesting device, collecting the grain within at least one of the containers; and measuring the characteristic of the grain within the container using the sensor.

In another respect, this invention is a grain harvesting and measuring system including a grain harvesting device and at least one grain container coupled to the grain harvesting device. The system also includes at least one sensor having an output representative of a density of grain within the container, and at least one signal processor having an input comprising the output from the sensor.

In another respect, this invention is a method for harvesting grain, including the steps of providing a grain harvesting and measuring system including a grain harvesting device, at least one grain container coupled to the grain harvesting device, at least one sensor having an output representative of a density of grain within the container, and at least one signal processor having an input comprising the output from the sensor. The method also includes the steps of harvesting grain with the grain harvesting device, collecting the grain within the container, and measuring the density of the grain within the container.

DESCRIPTION OF SPECIFIC EMBODIMENTS

In embodiments of the disclosed method and apparatus, characteristics of grain contained within one or more grain containers or weigh buckets may be measured and/or calculated. As used herein in relation to grain, "characteristic" is defined to include properties such as, but not limited to, grain moisture content, grain temperature, grain protein content, grain oil content, grain density, grain weight within a grain container, grain level within a grain container, grain volume within a grain container, grain flow rate, grain test weight, and the like. Unlike previous grain measurement devices, using one embodiment of the disclosed method and apparatus, substantially all grain characteristic measurements may be made on a single grain sample contained in a single non-segmented container. By "non-segmented" it is meant that the container has no separate compartments, chambers or tanks. Therefore, advantageously, such a sample may represent the entire grain sample, or all of the grain, harvested from a one test plot.

Figure 1:
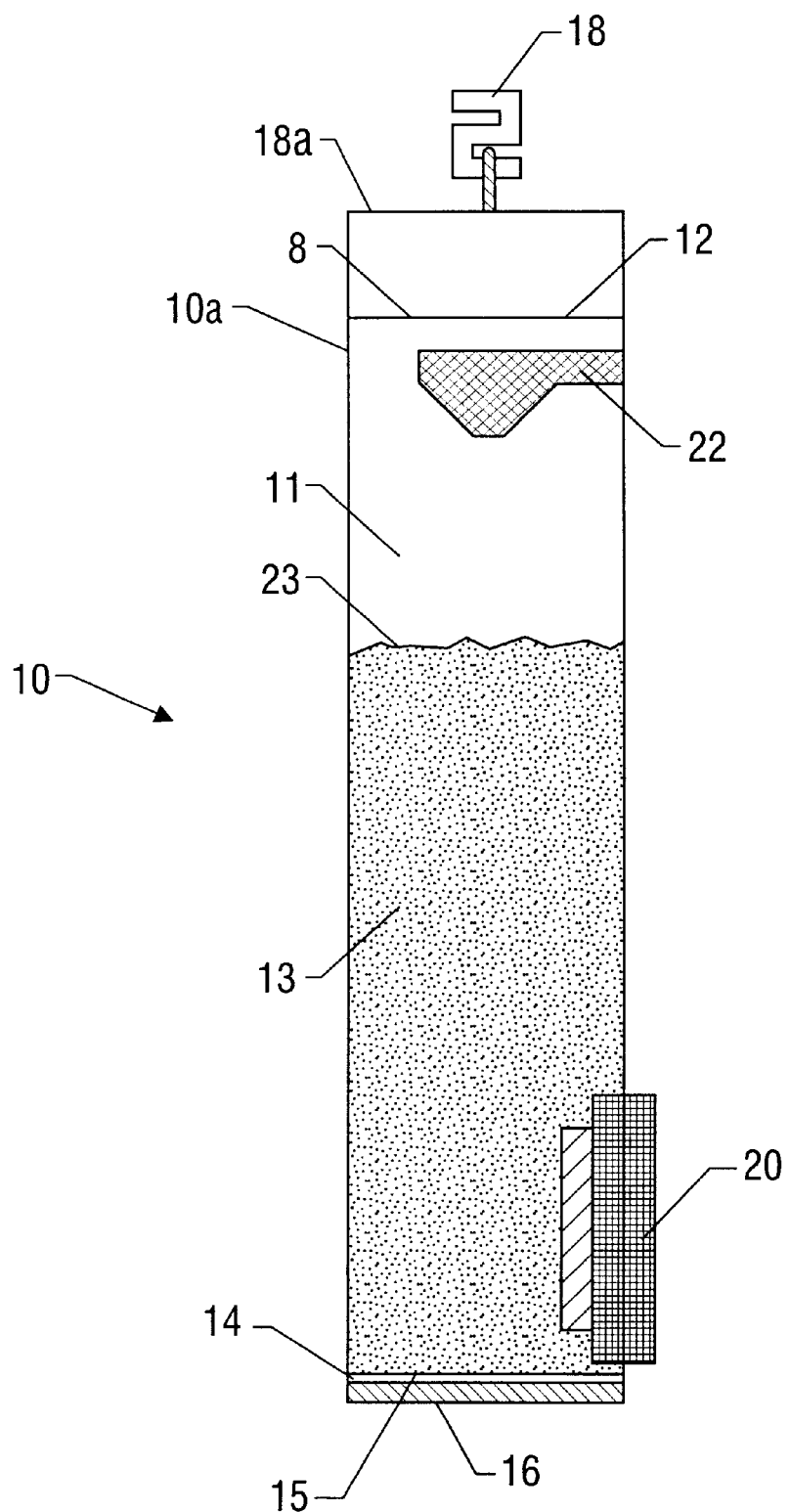
FIG. 1 is a simplified cross sectional view of a weigh bucket according to one embodiment of the disclosed method and apparatus.

In one embodiment of the disclosed method and apparatus a grain measuring apparatus comprising a weigh bucket 10 as shown in FIG. 1 is employed. In this embodiment, weigh bucket 10 typically includes a grain container or body 11. Grain container 11 may be mechanically coupled or otherwise attached to a grain harvesting device or other grain processing equipment using any method known to those of skill in the art. As shown, upper end 10a of grain container 11 is open to form an inlet 8 in communication with the interior of container 11 to allow grain 13 from a grain source, such as processed or harvested grain handling equipment, into grain container 11. Sensor shield 12 has a function to equally disperse the grain in grain container 11 and to dissipate grain velocity and shield level sensor 22. Bottom 14 of grain container 11 is open to function as an outlet 15 in communication with the interior of container 11 for discharging grain from container 11. A discharge control device 16 is provided in order to selectively retain and release a grain sample 13 out of grain container 11. In this embodiment, a weight sensor 18 is typically provided for measuring weight change of weigh bucket 10 as a grain sample 13 enters grain container 11. As shown in FIG. 1, weigh bucket 10 is typically suspended from weight sensor 18 via bracket 18a but may be coupled to, or positioned in communication with, grain container 11 in any other suitable manner known in the art. A moisture sensor 20 in communication with grain container 11 is also typically employed to measure the moisture content of the grain sample 13, and a grain level sensor 22 in communication with grain container 11 is typically employed to sense the level of grain 13 within grain container 11. As used herein, when a sensor is said to be "in communication" with a grain container or other designated area of a grain processing system, it means a sensor is oriented or otherwise configured to sense or detect a characteristic of grain within the grain container or other designated area of a grain processing system.

To increase test weight measurement accuracy, grain container 11 is typically of an elongated shape having a substantially constant cross-sectional area such that change in the level of grain 13 as a function of change in grain volume within grain container 11 are enhanced. However, grain container 11 may be of any suitable dimensions for containing and analyzing grain. Typically, grain container 11 has a length of between about 36 and about 60 inches and a cross sectional area of between about 28 and about 80 inches, thereby yielding an internal volume of between about 1,700 and about 2,800 cubic inches. Grain container 11 may be constructed of any material suitable for containing grain samples including, but not limited to, steel, aluminum, or plastic. Grain container 11 may also have any shape suitable for containing grain samples including, but not limited to, cylindrical, square, rectangular, or triangular. Most typically, grain container 11 is cylindrical in shape and is constructed of steel having a wall thickness of about 0.083 inches. In this most typical embodiment, grain container 11 has a diameter of about 8 inches, a length of about 42 inches and an internal volume of about 2,100 cubic inches.

In the embodiment of FIG. 1, grain level sensor 22 is typically positioned toward upper end 10a of grain container 11. In this embodiment, grain level sensor 22 may be any sensor suitable for sensing varying levels 23 of grain 13 within grain container 11 and producing an output signal representative thereof. Advantageously, use of such a sensor eliminates the necessity for reliance on the mechanical action of a leveling device or gate which contacts or manipulates the grain, and permits virtually instantaneous measurement of a grain level once the grain has settled. In a most typical embodiment, level sensor 22 is capable of producing an output signal that varies according to a varying level of grain within container 11 for use in calculations of grain characteristics, such as volume within container 11, grain density, and grain test weight. By "varying according to" it is meant that a signal varies proportionally, or is otherwise representative of the quantitative magnitude of the level of grain within a container, rather than just representing whether or not a particular level of grain exists within the container. Therefore, the need for filling a fixed volume chamber with grain is eliminated. Since a fixed volume of grain is not required, measurements may be performed on an entire test plot volume of grain contained within container 11. Accuracy of test weight measurement is improved because it is based on the entire test plot volume contained within weigh bucket 10, rather than a small sample in a separate test weight device.

Figure 2:
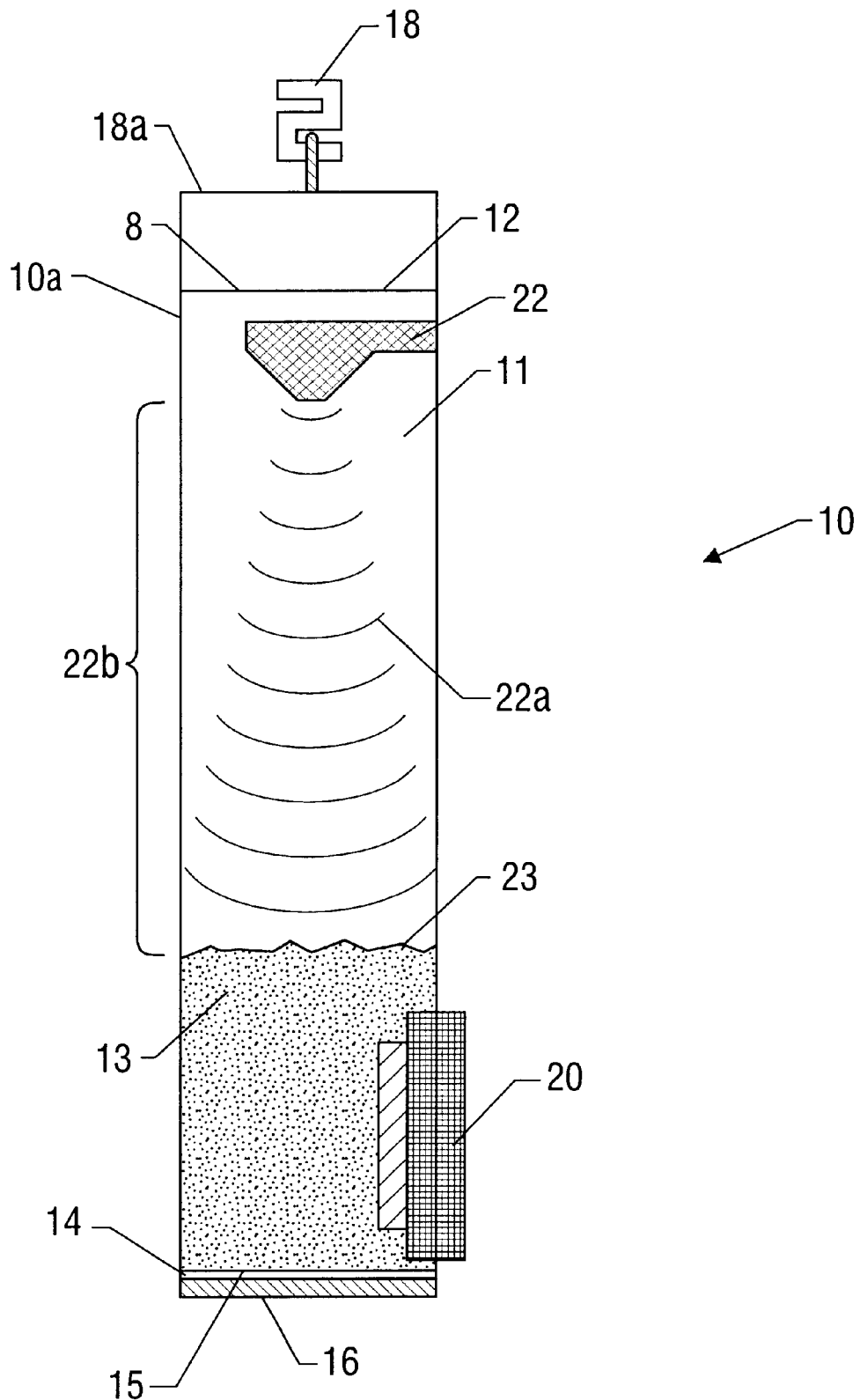
FIG. 2 is a simplified cross sectional view of the weigh bucket embodiment of FIG. 1, illustrating grain volume measurement in progress.

Examples of suitable sensors 22 include, but are not limited to, ultrasonic sensors, radar sensors, laser sensors, optical sensors, photoelectric sensors, dielectrical sensors, mechanical sensing means, and may include more than one sensor positioned at differing levels within container 11. Suitable radar sensors include "WAVERADAR" available from Bindicator, of Port Huron, Mich. Suitable laser sensors include "ACCURANGE 4000" available from Acuity Research of Menlo Park, Calif. Most typically, a "SM506A" ultrasonic sensor available from Hyde Park of Dayton, Ohio is employed and is positioned about 6 inches above the anticipated maximum grain level within grain container 11 as shown in FIG. 2. Ultrasonic waves 22a are then used to sense the level 23 of grain 13 by sensing or measuring the distance 22b between sensor 22 and grain level 23. In addition to the grain level sensors shown and described above, other types of sensors capable of measuring grain level may be employed with any of the embodiments in the present disclosure. These include optical or electro-optical sensors with or without separate light sources (such as a single axis position sensing photodiode and/or window(s) in the surface of a weigh bucket, like a "UNITED DETECTOR TECHNOLOGY, INC." model "PIN-SC\4"), segmented silicon array window(s) placed opposite radiation source window(s) in surfaces of a weigh bucket or measuring infrared light curtain systems, such as "BEAM-ARRAY" available from Banner of Minneapolis, Minn.

Figure 6:
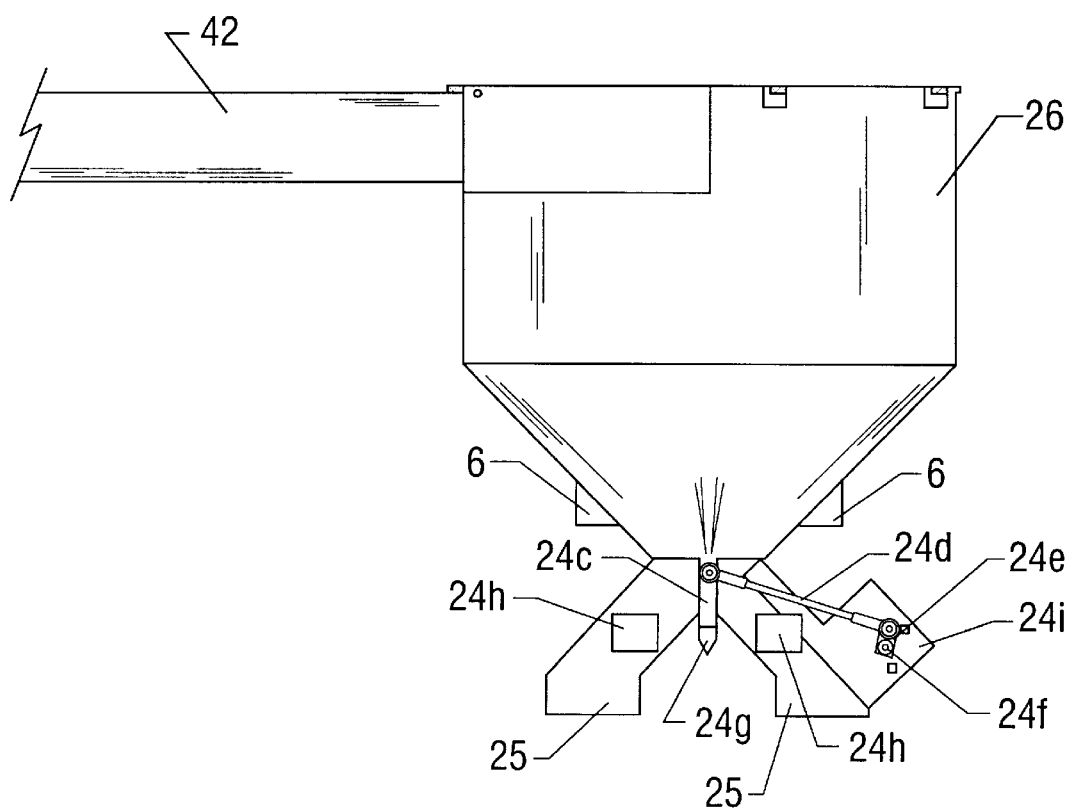
FIG. 6 is a frontal view of a cyclone speed reducer and dual weigh bucket diverter valve according to one embodiment of the disclosed method and apparatus.
Figure 7:
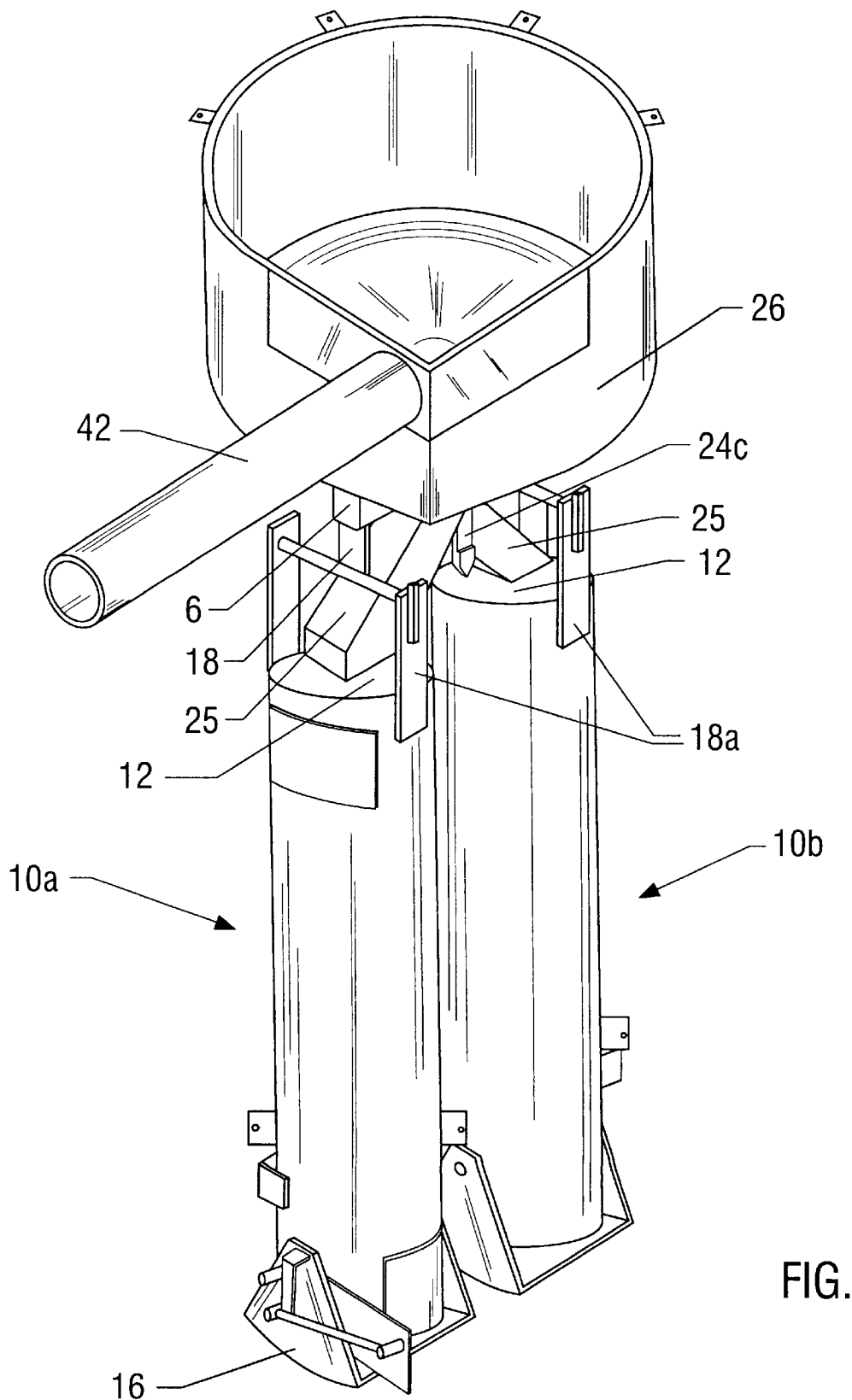
FIG. 7 is a perspective view of a cyclone speed reducer, dual weigh bucket diverter valve, and dual weigh buckets according to one embodiment of the disclosed method and apparatus.

In the embodiment of FIG. 1, a weight sensor 18 is typically mounted to upper end 10a in order to suspend grain container 11 as shown in FIG. 1. Although not shown in FIG. 1, weight sensor 18 may be suspended from a support bracket 6 connected to a cyclone speed reducer 26 as shown in FIGS. 6 and 7. However, any other suitable way of mounting a weight sensor to sense weight of grain within a container 11 may be employed. Weight sensor 18 may be any device suitable for measuring or sensing the weight of weigh bucket 10 and of producing an output signal representative of a weight of grain within container 11. Such suitable sensors include, but are not limited to, a strain gauge or load cell such as a "MODEL 20210 TYPE (S)" available from Artech Industries, of Riverside, Calif. Other suitable types of load cells that may be utilized are shear beam types, such as a "MODEL 30310", also available from Artech Industries. Still other embodiments may utilize platform scale load cells such as a "MODEL 61010," available from Artech Industries. Weight sensor 18 may also be mounted to any other suitable points or on multiple points on weigh bucket 10.

As shown in FIG. 1, Weigh bucket 10 may also include a moisture sensor or transducer 20 for sensing moisture content of grain within weigh bucket 10 and of producing an output signal representative of a moisture content of grain within container 11. Suitable moisture sensors include, but are not limited to, capacitance devices, variable resistance devices, infrared devices, and microwave devices. Suitable infrared devices include Near Infrared (NIR) or Near Infrared Transmittance (NIT) devices, which may be used, for example, with infrared source and detection windows in surfaces of a weigh bucket to pass near infrared energy through grain samples and thereby sense, among other things, moisture, protein, and/or oil content in grain products. Nuclear Magnetic Resonance (NMR) may also be used for the detection of moisture and/or oil content in grain products. In other embodiments, a moisture sensor 20 may be a microwave moisture/density sensor capable of sensing grain density as well as grain moisture content within container 11, and of producing an output signal representative of both a moisture content and a density of grain within container 11. Such sensors include, for example, a "MDA 1000", available from KDC Technology Corporation of Livermore, Calif. Such a moisture/density sensor 20 may be positioned as shown in FIG. 1 or may be alternately positioned in other suitable locations, such as in an area having a suitable cross section of flowing grain (typically a cross section of about two inches or more), so that density measurements are more representative of an overall grain sample. When used, such a microwave moisture/density sensor may be employed alone (without weight and/or level sensors) to directly sense grain density, or may be employed in addition to other sensors including, but not limited to, weight and/or level sensors. Furthermore, it will be understood with benefit of this disclosure that such a sensor or other types of density sensors 21 may be employed such as indicated above to directly sense grain density and produce an output signal representative of a density of grain within container 11 without sensing moisture content.

In a most typical embodiment, moisture sensor 20 is a "602E382" available from DMC, Inc., of Mason City, Iowa. Moisture sensor 20 may be mounted in a location as shown in FIG. 1, or alternatively in any suitable location in or on weigh bucket 10. Although not shown in FIG. 1, one or more grain flow sensors 40 may also be employed to sense grain flow into weigh bucket 10. Flow sensor 40 may be any sensor suitable for sensing flow rate of grain and of producing an output signal representative of the flow rate of grain into container 11. Such a sensor 40 is shown in one possible position mounted in the grain flow path within a cyclone speed reducer 26 of a dual weigh bucket embodiment in FIG. 3. Such a position may be desirable to help ensure that no blockage of grain flow occurs around the sensor. However, it will be understood that one or more grain flow sensors 40 may be employed in a variety of other positions within the grain flow path of a grain system of the disclosed method and apparatus, including within air delivery system 42. It will also be understood that grain flow sensors 40 may also be used with single weigh bucket embodiments and embodiments having more than two weigh buckets.

In the embodiment of FIG. 1, a discharge control device 16 is typically provided to allow a grain sample out of weigh bucket 10 after analysis. FIG. 7 shows this embodiment in greater detail. Most typically discharge control device 16 is a door as shown in FIG. 7. Typically, this door is hinged and motor operated, such as by means of a automotive windshield wiper motor. However, other suitable discharge control device configurations may be employed including, but not limited to, sliding gates and devices using linear actuators, solenoids, or hydraulic or pneumatic cylinders. Although one embodiment of a weigh bucket device is illustrated in FIG. 1, it will be understood with benefit of this disclosure that other configurations of weigh bucket may be used. For example, weigh buckets having varying dimensions and shapes may be employed. Weigh buckets employing multiple weight sensors 18, level sensors 22, flow sensors 40, and/or moisture sensors 20 may also be used. In addition, one or more of these sensors for measuring qualities or characteristics of grain may be omitted or placed in varying locations on weigh bucket 10. Sensors for measuring grain qualities or characteristics other than grain weight, grain flow, grain moisture content, grain density, and grain level may also be employed.

Figure 4:
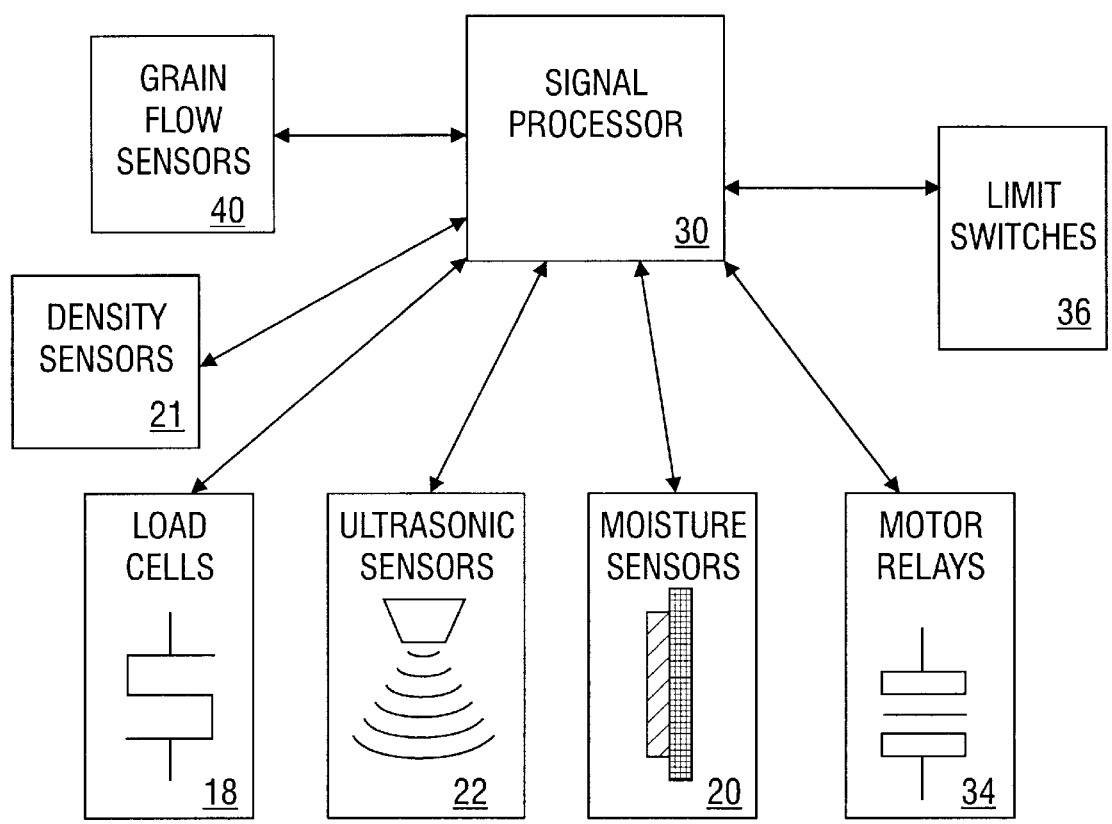
FIG. 4 is a simplified block diagram of electrical control circuitry according to one embodiment of the disclosed method and apparatus.

As illustrated in the embodiment of FIG. 4, a signal processor 30 may be employed in signal communication with various other devices, for example to receive input signals from sensors (including, but not limited to, sensors 18, 20, 21, 22 and/or 40), as well as various limit devices 36. By "in signal communication" it is meant that components are electrically connected, coupled, or otherwise configured to send and receive signals including, but not limited to, electrical signals, radio signals, optical signals, ultrasonic signals, etc. Signal processor 30 may also be configured in signal communication to produce output control signals to various electric or electronic control devices 34 (such as motor relays and/or solenoids) used in embodiments of the disclosed method and apparatus. Signal processor 30 may also produce output signals representative of, among other things, one or more characteristics of grain within container 11. Such output signals may be representative of the same characteristics as the sensor output signals, or may be representative of different characteristics, such as those calculated from one of more of the sensor output signals.

For example, after a grain sample has been received by weigh bucket 10, signal processor 30 may be employed to receive as an input signal the weight and/or moisture output signals from weight sensor 18 and moisture sensor 20, respectively, and to convert these electrical readings into units of weight and moisture which may then be processed, output as a signal and/or recorded. In those embodiments where a density sensor 21 or moisture/density type of sensor 20 is employed, grain density output signals may also be processed in the same manner. Signal processor 30 may also receive as an input signal the grain flow output signal from flow sensor 40 and process this signal in a similar way.

In a similar manner, signal processor 30 may be employed to receive as an input signal the grain level output signal from level sensor 22, and to convert this electrical reading into units of height or volume which may then be further processed, output as a signal by the signal processor 30, and/or recorded. In this way, volume of an individual grain sample may be calculated. Once so determined, the sample volume value may be combined with the measured grain weight and moisture values to calculate bulk density (or test weight) of the grain sample, which value may be further processed, output as a signal by the signal processor 30, and/or recorded as described above. As an example, moisture is used in the calculation of corn test weight because corn is less dense at higher moisture contents than at lower moisture contents. As one specific example, for corn the seed industry accepted adjustment for moisture is the addition of 0.25 pound per bushel of test weight for every 1.0% seed moisture over 15.5% moisture.

When calculations are complete, an output control signal from signal processor 30 may be sent to activate a motor connected to discharge control device 16 to release or dump the grain sample. This may be accomplished, for example, by an output control signal from signal processor 30 capable of activating a relay or other electric or electronic control device 34 in signal communication with processor 30. Other output control signals may be sent in similar fashion by signal processor 30 to activate motors, solenoids or other similar electric and/or electronic control devices that form part of the disclosed apparatus (such as part of grain discharge device 16 or diverter valve 24) and which are in signal communication with processor 30. Typically, the signal processing equipment used to activate devices (such as motors) comprises the optional Iotech "DBK25" relay expansion card. Additional contact relays may be employed in the circuit to reduce the current load on the expansion card relays. Limit devices 36 may be in signal communication with processor 30 and employed to sense the position of various components of a system (such as the door of a discharge control device 16). Limit devices 36 may be mechanical limit switches, proximity switches (such as inductive, capacitive, ultrasonic, etc.) or any other suitable type of similar limit device known in the art for sensing position. Information in the form of output signals from limit devices 36 and/or flow sensor 40 may be used as an input by signal processor 30 as operating parameters, and/or may be displayed to an operator, such as by means of indicator lights or on a computer screen. Typically the signal processing equipment used to sense the position of limit switches comprises the optional Iotech "DBK23" digital input expansion card.

In the practice of the disclosed method and apparatus, signal processor 30 may be any single or multiple component device known in the art that is suitable for processing data. In one possible embodiment, signal processor 30 includes data processing equipment that is in signal communication with sensors 18, 20, 21, 22, and/or 40 and other electrical or electronic control devices via separate data acquisition equipment. In this embodiment, data acquisition equipment may be any suitable data acquisition equipment capable of interfacing with the data processing equipment and of acquiring a number of electronic signals and performing analog/digital (A to D) conversions of these signals. This includes any suitable type of A to D conversion equipment, but most typically is a portable PC based microprocessor board capable of signal conditioning of the various sensor inputs. In this embodiment, the data acquisition equipment and separate data processing equipment may be collectively referred to as a "signal processor." Alternative types of signal processor arrangements may include plug-in data acquisition boards for computers with PC card (PCMCIA) or for computers with buses such as PCI, ISA, and Macintosh "NUBUS." Sensors, signal processor equipment, data acquisition equipment, and/or data processing equipment may be configured in signal communication to send and receive signals using any suitable method known in the art including, for example, by electrical or optical conductors, radio means, infrared means, ultrasonic means, etc. Most typically in this embodiment, the data acquisition equipment is an Iotech "DAQBOOK MODEL 120" with optional "DBK15" and "DBK16" expansion I/O cards, available from Iotech of Cleveland, Ohio.

In one embodiment, automated or manual operation of electrical components of weigh bucket 10 may be accomplished in whole or in part using software code run on signal processor 30, which typically includes a central processing unit ("CPU"). In the embodiment employing separate data acquisition equipment described above, a CPU is typically a laptop computer, and most typically a laptop computer of a rugged construction such as a Getac "IP66" available from Inglewood, Calif. However, other types of CPUs may be employed including, for example, a Fieldworks "FW5000," available from Fieldworks of Eden Praire, Minn. A portable or laptop computer is not necessary, but is typically desirable for mobile operations, such as when used with a grain harvesting device, such as a combine or forage harvester. In such an application, a portable or laptop computer is typically mounted in the cab of a combine for operator access. Other types of CPUs may be desirable when used with a test bucket installed in a permanent grain facility, such as a grain elevator, cereal grain processing plant or seed production plant, or when employed at a remote sensing location. When employed in a remote sensing location, separate data acquisition equipment may be connected directly or via a CPU to a transmitter/receiver capable of communicating with a CPU or other processing device at another location. Suitable receiver/transmitter equipment include, but are not limited to, radio, space, cellular, and phone-modem based equipment.

Although particular embodiments have been described above and illustrated in FIG. 4, it will be understood with the benefit of the present disclosure that signals from sensors 18, 20, 21, 22, and/or 40 may also be combined and/or processed in a number of other ways. For example, this may be accomplished using analog instrumentation and/or controllers with a single processor that performs both data acquisition and data processing. In addition to automated operation as described above, data acquisition equipment may be configured to allow an operator to manually access or take readings of weight, grain flow, grain level and/or moisture at any time. Signal processor 30 may also be configured to allow an operator to manually activate discharge control device 16. In any case, a suitable signal processor and/or display unit may be employed to both activate taking of readings and display reading values.

Figure 3:
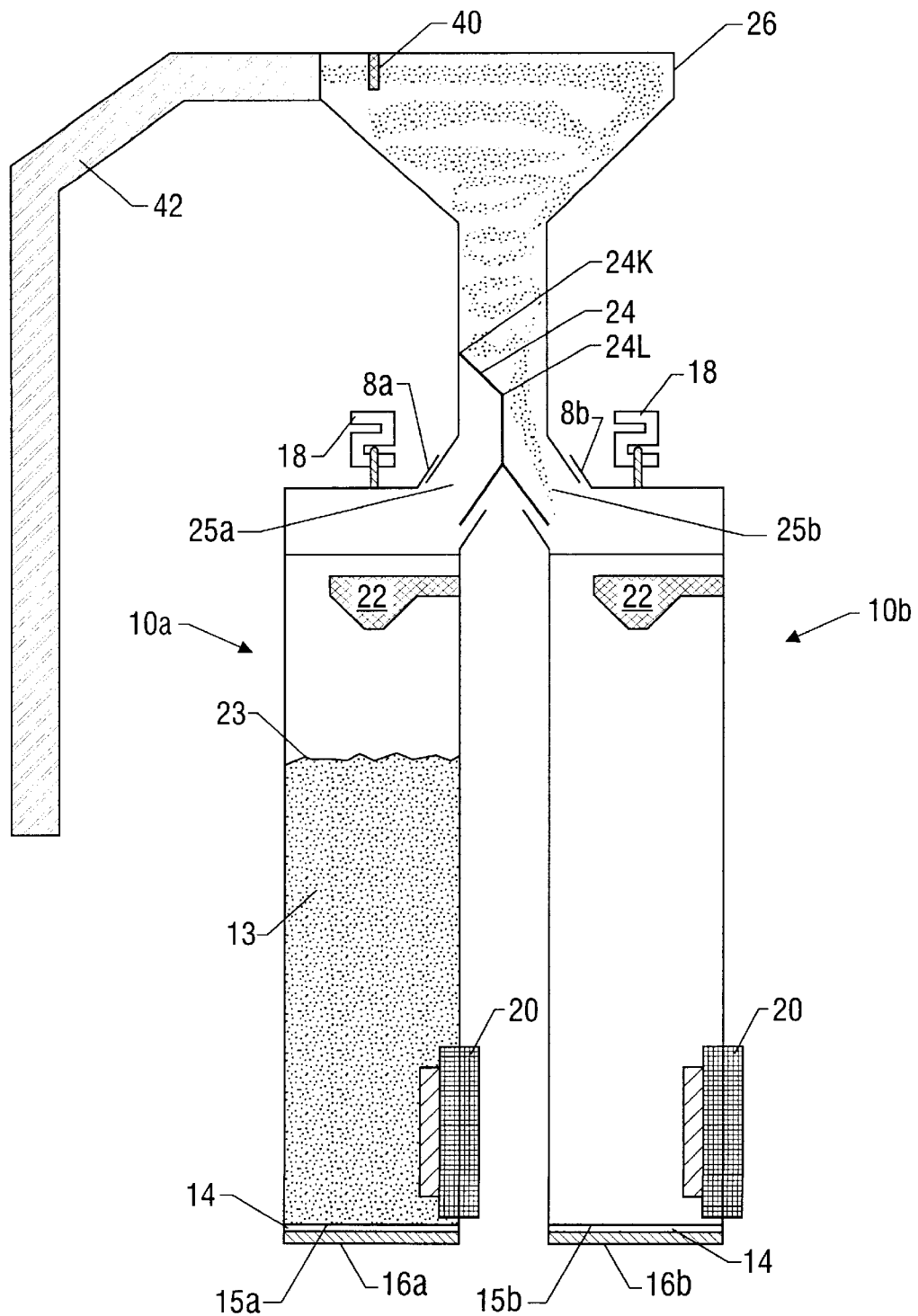
FIG. 3 is a simplified cross sectional view of a dual weigh bucket configuration and diverter valve according to one embodiment of the disclosed method and apparatus.
Figure 9:
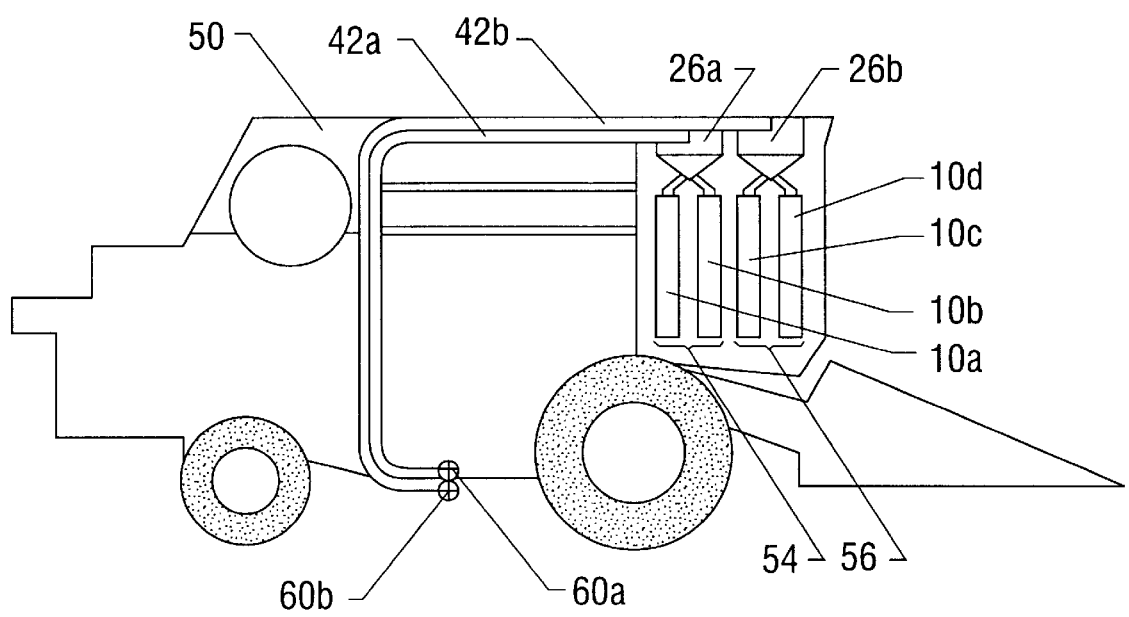
FIG. 9 is a side view of a dual weigh bucket installation on a two-plot combine according to one embodiment of the disclosed method and apparatus.

FIG. 3 illustrates another embodiment of the disclosed method and apparatus incorporating a multiple weigh bucket system. Such a multiple weigh bucket system is typically employed with a combine for harvesting sequential test plots. Advantageously, such a multiple weight bucket system allows sensors to stabilize and analyze a grain sample from one plot while grain samples from a sequential plot are collected simultaneously. In this way, a combine may proceed with little or no interruption from one sequential test plot to another, delaying only long enough between test plots to allow all the grain from one test plot to be discharged into its respective container so that grain from the next test plot may be diverted into the other container. A multiple weigh bucket system may also be utilized with multiple-plot combines for further improvements in test plot harvesting efficiency. For example, a two-plot combine may employ a separate dual weigh bucket system connected to each separate threshing side of the combine so that grain from one separate threshing side of the combine is directed to a first dual weigh bucket system and grain from a second side is conducted to a second dual weigh bucket system as shown in FIG. 9. It will be understood with benefit of the present disclosure that multiple weigh bucket systems may also be employed with single plot combines or combines capable of harvesting more than two-plots simultaneously. Multiple weigh bucket systems that include more than two weigh buckets are also possible (such as triple or quadruple weigh bucket systems).

A typical dual weigh bucket embodiment is illustrated in FIG. 3 and in greater detail in FIG. 7. In this embodiment grain is delivered to the system via a pneumatic or air delivery system 42. Air is typically supplied by a positive displacement pump, such as a model GACLBPA having a 3 inch diameter inlet and 3 inch diameter outlet available from Sutorbuilt of Quincy, Ill. However, air may also be supplied by any other suitable source including, but not limited to, centrifugal fan or compressed air. Typically, grain is directed or measured into air delivery system 42 using an airlock system. Suitable airlock systems include those known to those skilled in the art having a "wheel and paddle" configuration. Such airlock systems include designs available from William Meyer and Son of Skokie, Ill. However, an airlock system is not required.

Air delivery system 42 is typically configured to deliver grain to a cyclone speed 10 reducer 26. Cyclone speed reducer 26 serves both to reduce the speed of the incoming grain as well as to redirect the grain into inlets 8a and/or 8b of weigh buckets 10a and 10b. FIG. 6 shows one embodiment of air delivery system 42, cyclone speed reducer 26, and diverter valve 24 in greater detail. Other types of speed reducers such as paddle wheels or deflection plates may also be employed. Although illustrated in use with a dual weigh bucket system embodiment, it will be understood with benefit of the present disclosure that air delivery system 42 and/or cyclone speed reducer 26 may be employed with single weigh bucket systems or multiple weigh bucket systems having more than two weigh buckets.

Figure 5:
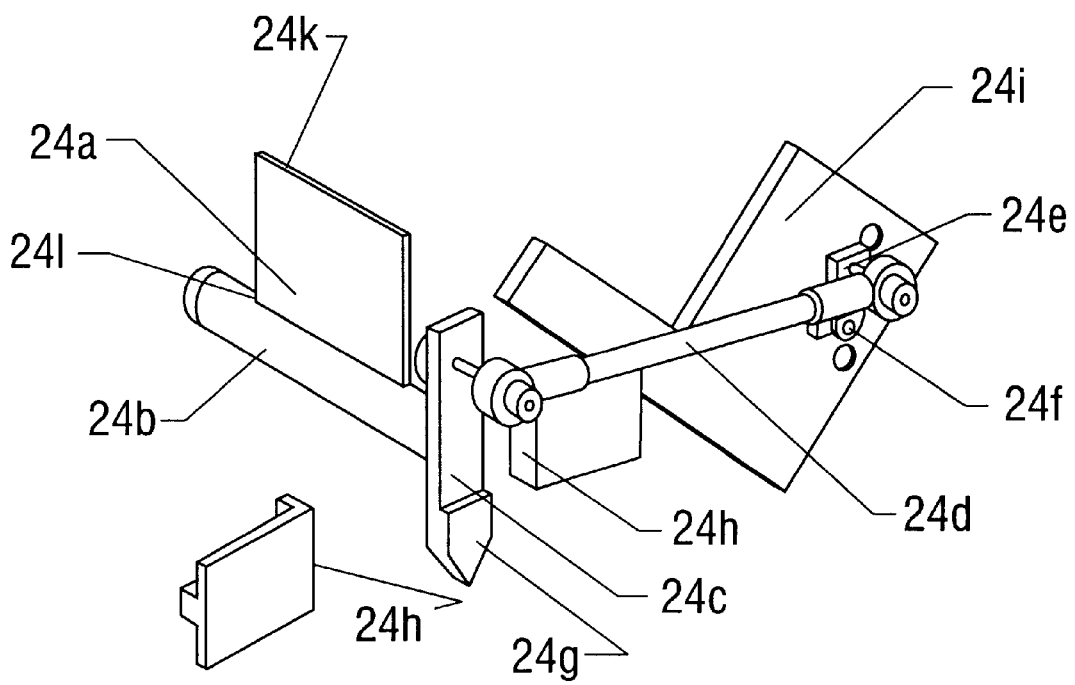
FIG. 5 is a perspective spatial view of the components of a diverter valve according to one embodiment of the disclosed method and apparatus.

A grain diversion device or diverter valve 24 is typically employed to selectively direct grain samples to either of the inlets 8a or 8b of the container of weigh bucket 10a or weigh bucket 10b. One embodiment of diverter valve 24 is shown in greater detail in FIG. 5. As shown in FIG. 5, diverter valve 24 typically includes a diverter plate 24a having a first end 24l mounted on an axle 24b which is in turn mounted to pivot arm 24c so that the diverter plate 24 is pivotable about its first end 24l, and so that the second end 24k of the diverter plate 24 may be selectively positioned or disposed in the flow path between a grain source and either of inlets 8a or 8b to accomplish grain diversion. Diverter plate 24a is typically manufactured of sheet metal, but may be of any other construction suitable for diverting grain, such as hard plastic, wood, etc. A connector arm 24d connects pivot arm 24c to lever arm 24e. In turn lever arm 24e is connected to power source axle 24f. Power source axle 24f is typically connected to a power source such as an automotive wiper electric motor or another suitable power source such as those described above for discharge control device 16. Pivot arm 24c also typically includes a limiting feature 24g which limits movement of pivot arm 24c such that diverter 24a is properly positioned to selectively direct grain from a grain source to weigh bucket 10a or weigh bucket 10b through grain distributor pathways 25a or 25b as shown in FIG. 3. Movement of pivot arm 24c is typically limited by contact of limiting feature 24g with limiting stops 24h. Power source axle 24f is typically secured to a dual weigh bucket system by securing plate 24i as further shown in FIG. 6.

In a typical embodiment, diverter valve assembly 24 includes an electric motor and motor relay control device 34 in signal communication with a signal processor 30 in a manner as previously described in relation to FIG. 4. In addition, one or more limit devices 36 may be employed to sense the position of diverter plate 24a in a manner as described in relation to FIG. 4. When connected in this manner and used with a combine for harvesting test plots, a signal may be sent to a motor relay 34 by processor 30 or manually by operator input to cause diversion of grain from the inlet of one weigh bucket to another as a combine moves from one test plot to the next sequential test plot. Although one embodiment of a grain diversion device or diverter valve 24 is illustrated, it will be understood with benefit of this disclosure that any type of device known in the art to be suitable for selectively diverting from the inlet of one container to the inlet of another container may be employed. For example, diversion devices without diverter plates, having more than one diverter plate, and/or having diverter plates oriented to operate in other planes or directions may be used. Furthermore, any devices known in the art to be suitable for diverting grain may also be employed.

In one embodiment, a grain flow sensor 40 may be employed to sense reduction or cessation of grain flow going to one of the weigh buckets, indicating that the grain from the previous test plot has almost completely gone through the combine. Grain flow information may be processed or displayed in a number of ways. For example, signal processor 30 may display the relative magnitude of grain flow so that an operator may view the grain flow and determine when harvesting may continue. Alternatively, at a preset grain flow output signal level from sensor 40, the signal processor 30 may indicate to the operator that entry into the next sequential plot may be accomplished without any mixing of the grain from the two different sequential test plots. Diversion of grain may be accomplished in any suitable manner including, but not limited to, manually by a separate switch, automatically by processor 30, or by manual operator input into processor 30.

Any suitable sensor for detecting grain movement or flow may be employed including, but not limited to, piezoelectric, strain gauge (load cell), capacitance, infrared, gamma ray emission/detection, potentiometric and photoelectric sensors. Specific examples include mechanical deflection devices which determine grain flow based on degree of deflection (such as pivotable flaps, deflection plates, and deflection vanes), impact detectors, photoelectric detectors for sensing height of a pile of crop material on a conveyor or paddles of a paddle elevator, differential weight devices (such as those which use a load cell to measure grain weight at one end of a pivotable auger), differential stress devices (such as those using a load cell to measure grain pressure or difference in stress between two points on an actuating arm projecting into the grain flow), grain conveyance motor current monitors, elevator paddle volume sensors, grain bin level sensors, catch bins which are repeatedly filled and emptied to determine flow rate, etc. Changing level output signals from a level sensor may also be used to indicate flow rate. Most typically, a piezoelectric sensor (such as a "GRAIN LOSS SENSOR" part no. 763163 available from New Holland of New Holland, Pa.) is employed. A grain flow sensor 40 may be located at any suitable point for monitoring grain flow rate, and may vary with the type of sensor employed. For example, a piezoelectric sensor may be mounted at a point downstream of the cylinders inside a combine, in a cyclone speed reducer 26 as shown for sensor 40 in FIG. 3, or at other suitable points in the grain flowstream. A differential stress device is typically located at a point within a cyclone speed reducer 26 as shown for sensor 40 in FIG. 3.

Although grain diversion is accomplished manually or with some manual input in some embodiments, it will be understood with benefit of the present disclosure that diversion may be automatically controlled by a signal processor based on grain flow signal values and by means of a signal sent directly to a motor relay 34 by the signal processor. In still another embodiment, a signal processor may control speed of a grain harvesting device based on grain flow rate and by means of a signal sent to a motor relay or other suitable device connected to the throttle of the grain harvesting device. In this embodiment, the speed of the grain harvesting device may be automatically controlled by a signal processor to delay entry into the next test plot until no risk of mixing of grain between test plots exists, thus relieving an operator of the need to constantly monitor speed of the grain harvesting device in relation to grain measurement and diversion.

It will be understood with benefit of the present disclosure that embodiments of the disclosed method and apparatus utilizing multiple weigh bucket systems with different cyclone configurations or entirely absent a cyclone 26 may be employed. Additionally, other types of speed reducers such as paddle wheels or deflection plates may also be employed. It will also be understood that diverter valve assembly 24 may also be configured in any suitable manner for accomplishing diversion of grain into multiple weigh buckets, either manually or automatically. Possible embodiments include diversion valves having diverting plates 24a and positioning lever 24c capable of greater than two positions so that diversion into weigh bucket systems incorporating three or more weigh buckets may be accomplished. Although illustrated with a grain level sensor 22, it will be understood with benefit of this disclosure that embodiments of the multiple weigh bucket system and/or diverter valve 24 may be employed with weigh bucket systems using separate test weight device(s) having a mechanical leveling arm as previously described.

In one example of the operation of the dual weigh bucket embodiment shown in FIG. 3, weight, moisture, and grain level sensor data for grain taken from one test plot is allowed to stabilize in a first weigh bucket 10a at the same time a second weigh bucket 10b is receiving grain from the next sequential test plot, thereby reducing or substantially eliminating the amount of delay required for sensor stabilization and analysis between test plots. After sensor stabilization, sensor data may be recorded or collected from the first weigh bucket 10a prior to dumping the analyzed grain from this bucket and rediverting grain from now-filled bucket 10b to empty bucket 10a. For example, after measurements are taken of grain in the first weigh bucket 10a, grain is dumped from the weigh bucket via hinged door 16a, and then transferred by mechanical means, such as by one or more augers or a paddle elevator, into a combine grain tank. Diverter valve 24 then activates to divert incoming grain from the next test plot into the first weigh bucket 10a. This prepares weigh bucket 10a to receive grain from the next test plot while sensors in the second weigh bucket 10b are allowed to stabilize. Grain from bucket 10b is then analyzed and discharged via door 16b in a similar manner as for bucket 10a. This process may be repeated over and over as necessary.

In one embodiment, a typical dual weigh bucket installation on a two-plot combine 50 (such as a "NEW HOLLAND TR87") includes four weigh buckets 10a, 10b, 10c, and 10d mounted on one side of combine 50, usually the side opposite the entry into the operator's cab as illustrated in FIG. 9. As shown in FIG. 9, weigh buckets 10a and 10b are part of a first dual weigh bucket system 54 having a cyclone speed reducer 26a connected to an air delivery system 42a of one separate threshing side of combine 50 having an airlock 60a. Weigh buckets 10c and 10d are part of a second dual weigh bucket system 56 having a cyclone speed reducer 26b connected to an air delivery system 42b of the other separate threshing side of combine 50 having an airlock 60b. However, any other mounting location or combination of mounting locations may be employed, including embodiments having weigh buckets on more than one side of a grain harvesting device. In operation of the embodiment of FIG. 9, one weigh bucket, 10a and 10c, from each system of dual weigh buckets 54 and 56 is typically filled with grain from a first set of two parallel test plots simultaneously. In the same manner as described above, sensors in weigh buckets 10a and 10c are allowed to stabilize while weigh buckets 10b and 10d of systems 54 and 56 are simultaneously filled with grain from a second set of sequential parallel test plots. This is accomplished between the first set of test plots and the next sequential set of test plots, where diverter valves of systems 54 and 56 are activated to divert grain from the filled grain weigh buckets 10a and 10c to the remaining grain weigh buckets 10b and 10d. While harvesting continues and weigh buckets 10b and 10d are being filled with grain from the second set of test plots, sensors of filled weigh buckets 10a and 10c are allowed to stabilize. Between the second and third sets of test plots, measurements are recorded on the grain in weigh buckets 10a and 10c. Once these measurements have been recorded, doors are activated to dump the measured grain, thereby emptying weigh buckets 10a and 10c so they are ready to receive grain from the third set of test plots. This process is repeated each time combine 50 moves from one sequential set of test plots to the next. It will be understood with benefit of the present disclosure that similar process steps may also be employed with grain harvesting devices capable of harvesting only one test plot or greater than two test plots at the same time.

Figure 8:
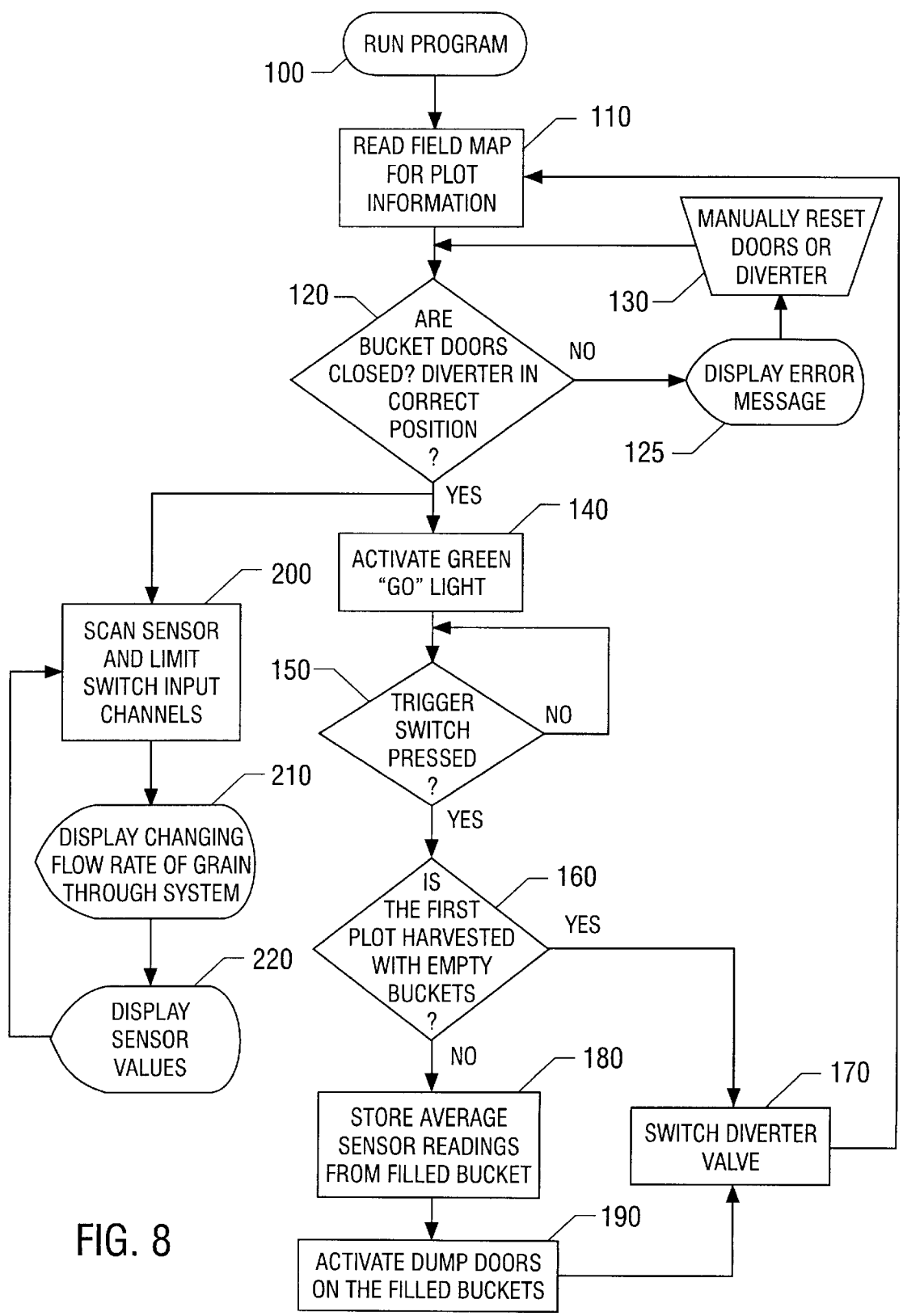
FIG. 8 is a flow chart illustrating grain harvest and measurement steps according to one embodiment of the disclosure method and apparatus.

FIG. 8 illustrates a block diagram representing one embodiment of the disclosed method using software code to harvest grain test plots with one possible dual weight bucket embodiment. When the combine operator is ready to begin harvesting, the database with the correct coordinates for the location to be harvested is selected on the processor 30. The test identification and plot numbers are displayed on a display screen connected to processor 30, typically programmed as a graphical user interface with graphic symbols representing the multiple weigh buckets. Once the software code and database have been loaded into the processor 30, the operator may proceed to harvest the test plots. Calibration of sensors 18 and 20 is typically performed earlier using known moisture samples and known weight samples using methods known to those skilled in the art. The slope and intercept of linear equations are then entered into the program. Raw sensor output values from the data acquisition equipment 32 are processed by processor 30 to display weight, moisture, and test weight. The data from each of these sensors is typically averaged to obtain one reading per plot.

As shown for the embodiment of FIG. 8, to begin harvesting the software program is initiated in block 100. In block 110, plot information (including but not limited to information such as test plot identification number, plot or entry number, and/or map coordinates of the plot within the field) is read or input into signal processor 30 to form a test plot database from which the processor 30 may work. In block 120, the program runs a self-check and queries whether weigh bucket doors are closed and whether the diverter valve is in correct position for grain diversion to a first bucket based on signals received from limit devices 36. If a door is open and/or diverter valve not in the correct position, this fact is displayed as an error message to the operator in block 125, and door and diverter control switches located in the cab of the combine must be manually reset by the operator in block 130 to place the doors and/or diverter valve in correct positions before the program proceeds. After manual resetting of the door and/or diverter positions, the error message is removed from the display and the program runs through the self-check in block 120 again. When the doors and diverter valve are in the correct positions, this fact is indicated to the operator by a green "go" light or other suitable indicator device in block 140, indicating the program is ready to proceed with harvesting the first plot. At this point, input channels for the various sensors (including sensors 18, 20, 21, 22, and/or 40) are repeatedly scanned in block 200 by processor 30. A value or other representation of the grain flow rate obtained from grain flow sensor 40 is displayed in block 210. Other sensor input information (such as moisture, test weight, plot grain weight, and/or density values) is displayed in block 220.

Continuing with the flow chart of FIG. 8, when the operator receives the indication in block 140 that the diverter valve and bucket doors are in the correct positions, harvesting operations may begin. During harvesting of the first test plot, the operator may monitor grain flow from the first test plot into the first test bucket as indicated in block 210. When the first test plot is harvested, the operator stops or delays the combine at the end of the plot and activates a trigger switch or similar input device. The program queries the trigger switch in block 150 and proceeds to block 160 when it senses that the trigger switch is activated. In block 160, the program determines if this is the first plot harvested. If it is the first test plot harvested, a signal is sent in block 170 to switch the diverter valve to divert grain into the second test bucket. The program then returns to block 110 and repeats blocks 120 and 140. When the green "go" light is again displayed, the operator may proceed with harvesting the second test plot. Between the second and third test plots, the operator stops or delays the combine and activates the trigger switch of block 150 to again activate the query in block 160. Since this is not the first test plot harvested, the program proceeds to block 180 where average sensor measurements on the grain in the first weigh bucket are taken and the data stored. The program then proceeds to block 190, where the door on the first weigh bucket is opened to dump the grain contained therein. In block 170, a signal is sent to switch the diverter to divert grain back into the first weigh bucket. The program then returns to block 110 and repeats again in a similar manner as above for each additional test plot harvested. This process continues until the program is stopped by the operator or the location is harvested.

Although one possible embodiment of software program has been described above and is illustrated in FIG. 8, it will be understood with benefit of the present disclosure that alternate steps and combinations of steps may be employed. For example, grain flow rate information from flow sensor 40 may be processed by processor 30 to sense the cessation of grain flow and used to advance the program to block 160 automatically, rather than relying on the manual trigger switch step of block 150. In addition, the steps indicated in FIG. 8 may be employed with two plot combines or other grain harvesting devices having more than one set of dual weigh buckets and/or more than one diverter valve.

In any case, when a test plot has been harvested and the data is ready to record, the operator may, for example, activate a switch or press a key to record the bucket weight, moisture, test weight, and other sensor data for that plot. This data may also be recorded automatically by, for example, processor 30 when sensor data indicates a harvesting device is between two test plots. Data may be recorded, for example, on a disk, PC card or other data storage means connected to or within signal processor 30, and/or transmitted to another location via remote control methods described previously. At this time, data processing unit 30 sends a signal to open discharge control device 16 of the bucket from which the data was read, and the grain released. Activation of the above-mentioned switch also causes processor 30 to signal the diverter valve 24 to switch from one bucket to another in preparation for harvesting the next test plot. Should the discharge control device 16 or diverter valve 24 malfunction, this fact is detected by the limit devices and displayed to the operator, so that harvesting does not proceed. Other features typically provided are manual control switches within the cab of a combine with which an operator may manually control the diverter valves and opening and closing of the doors of a discharge control device.

Although particular embodiments have been described and illustrated above, it will be understood with the benefit of the present disclosure that embodiments of the disclosed method and apparatus may be practiced with grain delivery systems having other configurations, such as those employing a holding hopper above one or more weigh buckets for holding grain while measurements are taken. Embodiments may also be employed in the harvesting or processing of grains other than corn including, but not limited to rice, soybean, canola, sunflower, sorghum, and wheat. In particular, it will be understood that embodiments of the disclosed method and apparatus, such as those including level sensors and/or multiple weigh buckets, may be employed with equipment other than grain harvesting devices including, but not limited to, grain processing facilities, such as cereal grain processing plants, flour processing plants, and seed production plants.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed apparatus and methods may be utilized in various combinations and/or independently. Thus the invention is not limited to only those combinations shown herein, but rather may include other combinations.

What is claimed is:

1. A grain harvesting and measuring system comprising:

a grain harvesting device;

at least one grain container coupled to said grain harvesting device;

at least one level sensor in communication with said grain container;

at least one weight sensor in communication with said grain container, said weight sensor being capable of sensing a static weight of grain within said grain container; and at least one signal processor in signal communication with said level sensor and said weight sensor.

2. The system of claim 1, further comprising at least one moisture sensor in communication with said grain container.

3. The system of claim 1, further comprising at least one grain flow sensor in communication with said grain container.

4. The system of claim 2, wherein said moisture sensor is a moisture/density sensor.

5. The system of claim 1, wherein:

said level sensor has an output representative of a level of grain within said container;

said weight sensor has an output representative of a weight of grain within said container; and said signal processor has an input and an output, said signal processor input comprising said level sensor output and said weight sensor output, and said signal processor output being representative of a characteristic of said grain.

6. The system of claim 2, wherein:

said level sensor has an output representative of a level of grain within said container;

said moisture sensor has an output representative of a moisture content of grain within said container;

said weight sensor has an output representative of a weight of grain within said container; and said signal processor has an input and an output, said signal processor input comprising said level sensor output, said moisture sensor output, and said weight sensor output, and said processor output being representative of a characteristic of said grain.

7. The system of claim 3, wherein:

said level sensor has an output representative of a level of grain within said container;

said moisture sensor has an output representative of a moisture content of grain within said container;

said weight sensor has an output representative of a weight of grain within said container;

said grain flow sensor has an output representative of a flow of grain into said container; and said signal processor has an input and an output, said signal processor input comprising said level sensor output, said moisture sensor output, said weight sensor output, and said grain flow sensor output, and said processor output being representative of a characteristic of said grain.

8. The system of claim 1, wherein said level sensor is an ultrasonic, laser or radar sensor.

9. The system of claim 6, wherein said characteristic is a test weight of said grain.

10. The system of claim 6, wherein said level sensor output varies according to a level of grain within said container.

11. The system of claim 1, wherein said container has at least one inlet in communication with an interior of said grain container and at least one outlet in communication with an interior of said grain container, wherein said outlet includes a discharge control device, and wherein said signal processor is in signal communication with said discharge control device to control release of said grain from said container.

12. The system of claim 1, wherein said container is non-segmented.

13. A grain measuring apparatus, comprising:

a grain container;

a moisture sensor having an output representative of a moisture content of grain within said container;

a weight sensor having an output representative of a weight of grain within said container;

a level sensor having an output representative of a level of grain within said container; and a signal processor having an input and an output, said signal processor input comprising said moisture sensor output, said weight sensor output, and said level sensor output, and said signal processor output being representative of a characteristic of said grain.

14. The apparatus of claim 13, further comprising at least one grain flow sensor having an output representative of a flow of grain into said container, and wherein said signal processor input further comprises said grain flow sensor output.

15. The apparatus of claim 13, wherein said moisture sensor is a moisture/density sensor, and wherein said output of said moisture sensor further comprises an output representative of a density of said grain within said container.

16. The apparatus of claim 13, wherein said container is coupled to a grain harvesting device.

17. The apparatus of claim 13, wherein said characteristic is a test weight of said grain.

18. The apparatus of claim 13, wherein said level sensor output varies according to a level of grain within said container.

19. The apparatus of claim 13, wherein said container has at least one inlet in communication with an interior of said grain container and at least one outlet in communication with an interior of said grain container; wherein said outlet includes a discharge control device, and wherein said signal processor has an output control signal to said discharge control device to control release of said grain from said container.

20. The apparatus of claim 13, wherein said container is non-segmented.

21. A grain harvesting and measuring system comprising:

a grain harvesting device having at least one grain source;

a plurality of grain containers, each of said containers having at least one respective inlet and at least one respective outlet in communication with an interior of said container, said containers being coupled to said grain harvesting device;

at least one sensor having an output representative of a characteristic of grain within each of said respective containers; and at least one grain diversion device coupled between said grain source and at least two of said container grain inlets, said grain diversion device being capable of selectively directing grain to either of said two container grain inlets.

22. The system of claim 21, wherein said plurality of grain containers comprises at least first and second grain containers; and wherein said grain diversion device is a grain diverter valve comprising a diverter plate having first and second ends, said diverter plate being pivotable about said first end such that said second end of said diverter plate is positionable in at least a first and a second position, said second end of said diverter plate being disposed in a grain flow path between said grain source and said first grain container inlet when positioned in said first position, said second end of said diverter plate being disposed in a grain flow path between said grain source and said second grain container inlet when positioned in said second position.

23. The system of claim 21, further comprising a signal processor having an input, said signal processor input comprising said output of said at least one sensor.

24. The system of claim 23, wherein said signal processor has an output, said signal processor output being representative of a characteristic of said grain.

25. The system of claim 21, wherein said at least one sensor comprises:

a moisture sensor having an output representative of a moisture content of grain within each of said containers;

a weight sensor having an output representative of a weight of grain within each of said containers;

a level sensor having an output representative of a level of grain within each of said containers; and further comprising a signal processor having an input and an output, said signal processor input comprising said moisture sensor output, said weight sensor output, and said level sensor output, and said signal processor output being representative of a characteristic of said grain.

26. The system of claim 25, wherein said level sensor is an ultrasonic, laser, or radar sensor.

27. The system of claim 25, wherein said signal processor output is representative of a test weight of said grain.

28. The system of claim 21, wherein said at least one sensor comprises a moisture/density sensor having an output representative of a moisture content of grain within each of said containers, and an output representative of a density of grain with each of said containers.

29. The system of claim 21, wherein said at least one sensor comprises a density sensor having an output representative of a density of grain within each of said containers.

30. The system of claim 23, wherein said outlets of each of said containers further comprises a discharge control device, and wherein said signal processor has an output control signal to said discharge control device to control release of said grain from said container.

31. The system of claim 23, wherein said signal processor has an output control signal to said grain diversion device to control diversion of said grain from said grain source to said container inlets.

32. The system of claim 23, further comprising at least one grain flow sensor having an output representative of a flow of grain into said container, and wherein said signal processor input further comprises said grain flow sensor output.

33. The system of claim 31, further comprising at least one grain flow sensor having an output representative of a flow of grain into said container, wherein said signal processor input further comprises said grain flow sensor output, and wherein said signal processor output control signal to said grain diversion device is based on said grain flow sensor output.

34. The system of claim 21, wherein each of said containers is non-segmented.

35. The system of claim 25, wherein said level sensor output varies according to a level of grain within said container.

36. The system of claim 30, wherein said grain harvesting device is a two-plot combine having first and second grain sources, wherein said plurality of containers includes first and second pairs of grain containers, and wherein a first grain diversion device is coupled between said first grain source and inlets of said first pair of containers and a second grain diversion device is coupled between said second grain source and inlets of said second pair of containers.

37. A method for measuring characteristics of grain, comprising:
  providing a grain measuring apparatus including:
    a grain container,
    a moisture sensor having an output representative of a moisture content of grain within said container,
    a weight sensor having an output representative of a weight of grain within said container,
    a level sensor having an output representative of a level of grain within said container, and
    a signal processor having an input and an output, said signal processor input comprising said moisture sensor output, said weight sensor output, and said level sensor output, and said signal processor output being representative of a characteristic of said grain;
  collecting grain within said container; and
  measuring said level, weight, and moisture content of said grain within said container.

38. The method of claim 37, wherein said grain measuring apparatus further comprises a grain flow sensor having an output representative of a flow of grain into said container, and wherein said signal processor input further comprises said grain flow sensor output.

39. The method of claim 37, wherein said moisture sensor is a moisture/density sensor, and wherein said output of said moisture sensor further comprises an output representative of a density of said grain within said container.

40. The method of claim 37, further comprising calculating a test weight of said grain based on said moisture, weight, and level outputs.

41. The method of claim 37, wherein said level sensor output varies according to a level of grain within said container.

42. The method of claim 37, wherein said container is non-segmented.

43. The method of claim 37, wherein said providing further comprises providing a grain harvesting device coupled to said grain measuring apparatus, and wherein said collecting further comprises harvesting said grain with said grain harvesting device.

44. A method for harvesting grain, comprising:
  providing a grain harvesting and measuring system comprising:
    a grain harvesting device,
    at least one grain container coupled to said grain harvesting device,
    at least one level sensor in communication with said grain container,
    at least one weight sensor in communication with said grain container said weight sensor being capable of sensing a static weight of grain within said grain container, and
    at least one signal processor in signal communication with said level sensor and said weight sensor;
  harvesting grain with said grain harvesting device;
  collecting said grain within said container; and
  measuring said level and static weight of said grain within said container.

45. The method of claim 44, wherein said grain harvesting and measuring system further comprises at least one moisture sensor in communication with said grain container.

46. The method of claim 44, wherein said grain harvesting and measuring system further comprises at least one grain flow sensor in communication with said grain container.

47. The method of claim 45, wherein said moisture sensor is a moisture/density sensor.

48. The method of claim 45, wherein:
  said level sensor has an output representative of a level of grain within said container;
  said moisture sensor has an output representative of a moisture content of grain within said container;
  said weight sensor has an output representative of a weight of grain within said container; and
  said signal processor has an input and an output, said signal processor input comprising said level sensor output, said moisture sensor output, and said weight sensor output, and said processor output being representative of a characteristic of said grain.

49. The method of claim 48, further comprising calculating a test weight of said grain based on said moisture, weight, and level outputs.

50. The method of claim 44, wherein said level sensor output varies according to a level of individual grain samples within said container.

51. The method of claim 44, wherein said container is non-segmented.

52. A method for harvesting grain test plots, comprising:
  providing a grain harvesting device having at least one grain source;

providing a grain measuring apparatus, said grain measuring apparatus including:
  a plurality of grain containers, each of said containers having at least one respective inlet and at least one respective outlet in communication with an interior of said container, said containers being coupled to said grain harvesting device,
  at least one sensor having an output representative of a characteristic of grain within each of said respective containers, and
  at least one grain diversion device coupled between said grain source and at least two of said container grain inlets, said grain diversion device being capable of selectively directing grain to either of said two container grain inlets;
harvesting said grain test plots with said grain harvesting device;
collecting said grain within at least one of said containers; and
measuring said characteristic of said grain within said container using said sensor.

53. The method of claim 52, wherein said grain measuring apparatus further comprises a signal processor having an input and an output, said signal processor input comprising said output of said at least one sensor, and said signal processor output being representative of a characteristic of said grain.

54. The method of claim 52, wherein said at least one sensor comprises:
  a moisture sensor having an output representative of a moisture content of grain within each of said containers;
  a weight sensor having an output representative of a weight of grain within each of said containers;
  a level sensor having an output representative of a level of grain within each of said containers; and
  further comprising a signal processor having an input and an output, said signal processor input comprising said moisture sensor output, said weight sensor output, and said level sensor output, and said signal processor output being representative of a characteristic of said grain.

55. The method of claim 54, further comprising calculating a test weight of said grain based on said moisture, weight, and level outputs.

56. The method of claim 53, wherein said grain measuring apparatus further comprises at least one grain flow sensor having an output representative of a flow of grain into said containers, and wherein said signal processor input further comprises said grain flow sensor output.

57. The method of claim 52, wherein said at least one sensor comprises a moisture/density sensor having an output representative of a moisture content of grain within each of said containers, and an output representative of a density of grain within each of said containers.

58. The method of claim 52, wherein said at least one sensor comprises a density sensor having an output representative of a density of grain within each of said containers.

59. The method of claim 52, wherein said grain harvesting device is a two-plot combine having first and second grain sources, wherein said plurality of containers includes first and second pairs of grain containers, and wherein a first grain diversion device is coupled between said first grain source and inlets of said first pair of containers and a second grain diversion device is coupled between said second grain source and inlets of said second pair of containers.

60. The method of claim 52, wherein said outlets of each of said containers further comprises a discharge control device, and wherein:
  said collecting further comprises controlling diversion of grain from said grain source to said containers using said grain diversion device; and
  said measuring further comprises controlling release of said grain from each of said containers using said discharge control devices after measurements are made.

61. The method of claim 60, wherein said grain test plots comprise at least first and second sequential grain test plots, wherein said at least two containers comprise first and second containers, and wherein:
  said collecting further comprises controlling diversion of grain harvested from said first sequential test plot from said grain source to said first container, and controlling diversion of grain harvested from said second sequential test plot from said grain source to said second container; and
  said measuring further comprises:
    releasing said grain harvested from said first test plot from said first container after measurements are made on said grain in said first container and before grain harvested from additional test plots is collected in said first container, and
    releasing said grain harvested from said second test plot from said second container after measurements are made on said grain in said second container and before grain harvested from additional test plots is collected in said second container.

62. The method of claim 61, wherein said grain test plots further comprise at least a third sequential grain test plot, wherein said first and second containers both contain grain when said grain harvesting device is positioned between said second and third sequential test plots, and wherein said measuring further comprises:
  recording said measurements on said grain harvested from said first test plot while said grain harvesting device is positioned between said second and third sequential grain test plots;
  releasing said grain harvested from said first test plot from said first container while said grain harvesting device is positioned between said second and third grain test plots; and
  controlling diversion of said grain from said grain source so that grain harvested from said third sequential test plot is diverted to said first container.

63. The method of claim 60, wherein said grain measuring apparatus further comprises at least one grain flow sensor having an output representative of a flow of grain into said containers, wherein said signal processor input further comprises said grain flow sensor output, and wherein said diversion of said grain is controlled based on said flow sensor output.

64. The method of claim 52, wherein said collecting includes collecting all of the grain harvested from one test plot within one of said containers, and wherein said measuring includes measuring characteristics of said all of said grain harvested from one test plot.

65. A grain harvesting and measuring system comprising:
  a grain harvesting device;
  at least one grain container coupled to said grain harvesting device;
  at least one sensor capable of directly sensing grain density and having an output representative of a density of grain within said container; and at least one signal processor having an input comprising said output from said at least one sensor.

66. The system of claim 65, wherein said at least one sensor is a moisture/density sensor, and wherein said output of said at least one sensor further comprises an output representative of a moisture content of grain within said container.

67. The system of claim 65, wherein said at least one sensor is a density sensor.

68. A method for harvesting grain, comprising:
   providing a grain harvesting and measuring system comprising:
      a grain harvesting device,
      at least one grain container coupled to said grain harvesting device,
      at least one sensor capable of directly sensing grain density and having an output representative of a density of grain within said container, and
      at least one signal processor having an input comprising said output from said at least one sensor;
   harvesting grain with said grain harvesting device;
   collecting said grain within said container; and
   measuring said density of said grain within said container.

69. The system of claim 68, wherein said at least one sensor is a moisture/density sensor, and wherein said output of said at least one sensor further comprises an output representative of a moisture content of grain within said container.

70. The system of claim 68, wherein said at least one sensor is a density sensor.

71. The system of claim 1, wherein said grain container is capable of containing all of the grain harvested from one test plot.

72. The system of claim 13, wherein each of said grain containers is capable of containing all of the grain harvested from one test plot.

73. The method of claim 37, wherein said collecting includes collecting all of the grain harvested from one test plot within said container; and wherein said measuring includes measuring the level and weight of said all of said grain harvested from one test plot.

74. The method of claim 44, wherein said collecting includes collecting all of the grain harvested from one test plot within said container; and wherein said measuring includes measuring the level and weight of said all of said grain harvested from one test plot.

75. The system of claim 65, wherein said grain container is capable of containing all of the grain harvested from one test plot.

76. A grain harvesting and measuring system comprising:
   a grain harvesting device;
   at least one grain container coupled to said grain harvesting device, said grain container being capable of containing all of the grain harvested from one test plot;
   at least one level sensor in communication with said grain container;
   at least one weight sensor in communication with said grain container; and
   at least one signal processor in signal communication with said level sensor and said weight sensor.

77. A method for harvesting grain, comprising:
   providing a grain harvesting and measuring system comprising:
      a grain harvesting device,
      at least one grain container coupled to said grain harvesting device, said grain container being capable of containing all of the grain harvested from one test plot,
      at least one level sensor in communication with said grain container,
      at least one weight sensor in communication with said grain container, and
      at least one signal processor in signal communication with said level sensor and said weight sensor;
   harvesting grain with said grain harvesting device;
   collecting said grain within said container; and
   measuring said level and weight of said grain within said container.

* * * * *